Figure 1:
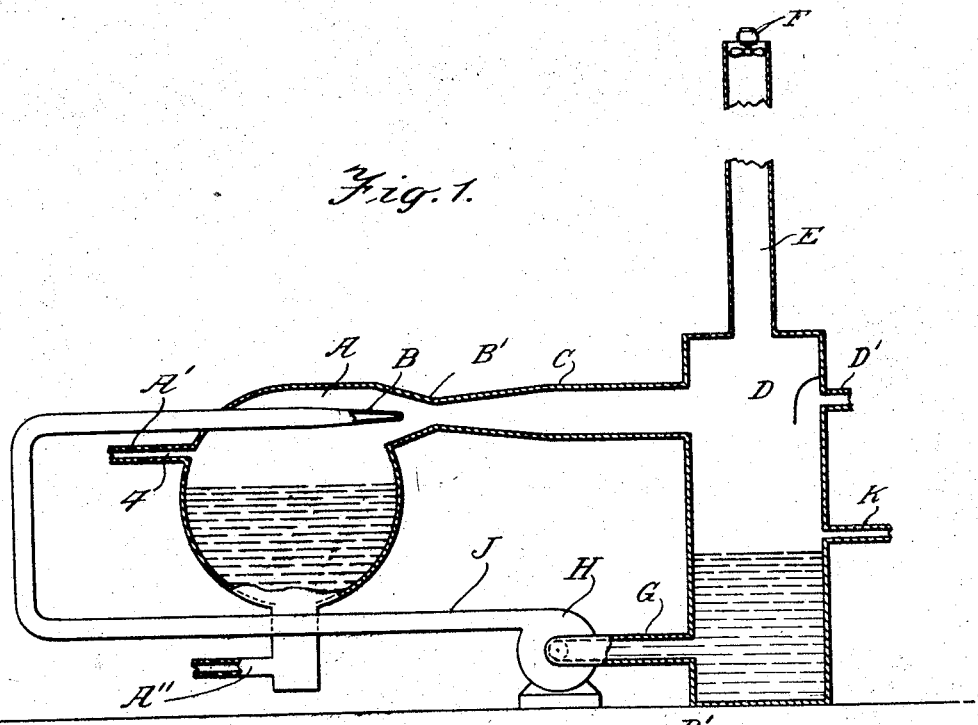

Feb. 27, 1940.    H. G. SCHAEFER    2,191,864
METHOD AND MEANS FOR COOLING FLUIDS
Filed April 14, 1937

INVENTOR.
Henry G. Schaefer
BY Ralph E. Clayton
ATTORNEY.

Patented Feb. 27, 1940

2,191,864

UNITED STATES PATENT OFFICE 2,191,864

METHOD AND MEANS FOR COOLING FLUIDS

Henry G. Schaefer, New York, N. Y.

Application April 14, 1937, Serial No. 136,823

2 Claims. (Cl. 62—152)

The present invention relates to the method of, and means for, cooling liquids and has more particular reference to the method of, and means for, cooling liquid by evaporation, more especially accelerated evaporation or vaporization obtained by reduction of the air pressure upon the liquid.

The object of the invention is to provide a more generally simplified and efficient apparatus and system for cooling liquids and to this end, the invention, generally stated, comprises means for creating a partial vacuum in a closed chamber so as to promote accelerated vaporization of the fluid contained therein by a continuous cyclic operation.

More specifically stated, the invention comprises a cyclic circulatory system including a pressure jet, the pressure jet reducing the air pressure in a closed, preferably hermetically sealed, container on the liquid contained therein, causing accelerated vaporization thereof and carrying the vapor to a condensing chamber where the vapor is partly condensed and added to the circulating medium employed to operate the pressure jet, the circulation and pressure in the jet being maintained by a pumping unit.

In the drawing accompanying this specification, several embodiments of the invention are illustrated although it is to be understood that such embodiments are merely for the purpose of affording a clear understanding of the underlying principles of the invention so that those skilled in the art may readily understand it without, however, limiting the invention to the specific details shown therein.

Figure 2:
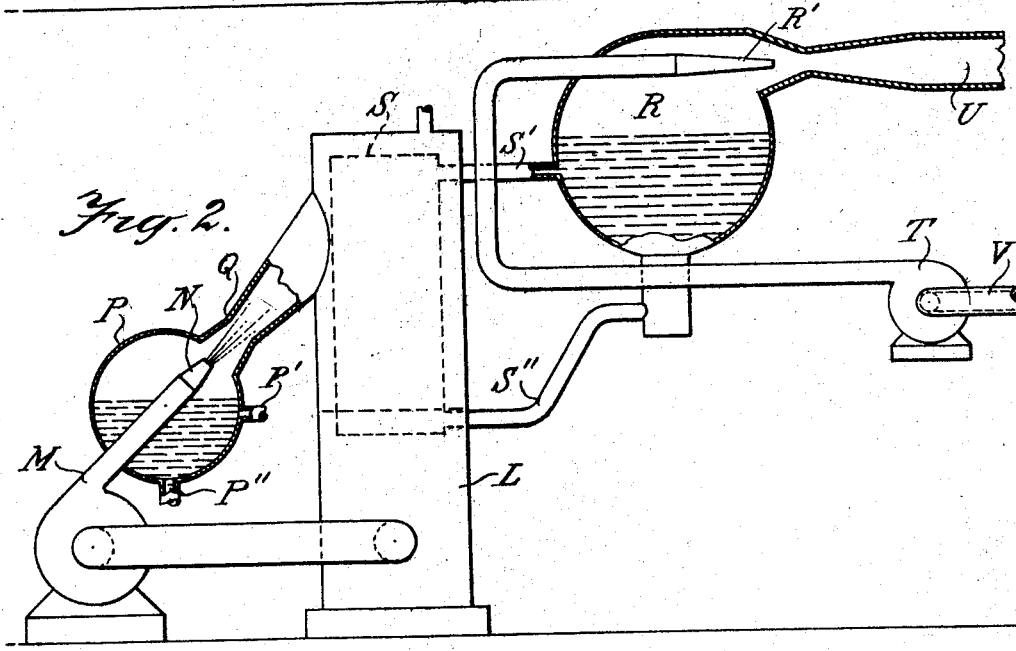

In said drawing:

Fig. 1 is a vertical section of my invention partly fragmentary and partly diagrammatic, and Fig. 2 is a similar view of a multiple stage arrangement of the invention.

Continuing now by way of a more detailed description, an evaporating or vaporizing vessel or tank A has a fluid inlet A' communicating with the interior thereof for the purpose of supplying the liquid to the tank, and an outlet A'' preferably at its lower end for discharging the fluid from the tank. The vessel or tank A conveniently is of such a shape as to completely drain toward the outlet A'', in the specific illustration taking the form of a sphere. This receptacle, or container, contains a body of liquid which is circulated to any convenient remote point to afford a supply of cooled liquid for any desired purpose, for instance, air conditioning apparatus.

The flow of water through the outlet and the fluid coming in at the inlet is regulated to afford a substantial body of fluid in the tank, or receptacle at all times, in order to afford a substantial surface area to permit the evaporation or vaporization to readily take place. This evaporation or vaporization is simply and efficiently achieved by a pressure nozzle B affording a fluid jet directed through a restricted opening B' so as to create a vacuum or partial vacuum above the surface area of the fluid in the upper portion of the tank or receptacle A. The fluid particles of the jet force the air particles through a conduit C into a condensing or separating chamber D having a vent or stack E which may be provided if desired, with a blower fan F adapted to be used in conjunction with an air inlet D' which may be opened when the fan is in operation. In order to minimize the loss of fluid in the form of vapor up the stack E, baffle plates might also be used. Irrespective of the form of control located in the stack, the stack is so proportioned with respect to the condenser that a portion of the vapor condenses in the chamber D and is delivered by means of a discharge conduit G to pump H which drives it through a conduit J terminating in the pressure nozzle B. An inlet K in the condensing chamber D affords means to replace any fluid lost in the circulatory system. This replacement is, however, generally negligible since the condensed vapor from the tank A is added to the vacuum producing system and concurrently with the removal of the fluid from tank D.

Referring more particularly to the multiple stage arrangement shown in Fig. 2, a condenser tank L similar to the tank D of Fig. 1 is connected to a pump M having a pressure nozzle N located in an evaporating or vaporizing chamber P similar to the chamber A of Fig. 1, the jet of nozzle N being directed through the restricted tube Q to function as an aspirator so as to cool the liquid in the vessel or chamber P, which is circulated to a remote point by the inlet P' and outlet P'' corresponding to the inlet and outlet A' and A'' respectively of Fig. 1. The fluid in the condensing chamber L is, however, subjected to an initial cooling by means of an arrangement also similar to that shown in Fig. 1, the cooled fluid of receptacle R being circulated through condenser coils S by way of conduits S' and S'' located in the chamber L, the fluid in the receptacle or chamber R being cooled by the removal of the latent heat caused by the vaporization effected by the reduction of the air pressure by the fluid jet issuing from the pressure nozzle R' circulated by pumping unit T. The conduits U and V are connected to a condenser (not shown) similar to condenser D.

While the present invention is not limited to the use of the same liquid in the cyclic circulatory system as the liquid to be cooled, nevertheless, such identity is preferred because the vapor of the fluid to be cooled is added to the fluid of the circulatory system.

It is claimed:

1. Liquid cooling means, including a tank for confining a body of liquid to be cooled and means for reducing to a desired degree the pressure above the liquid in the tank and to remove gases and vapors from said tank, comprising an independent liquid circulating system including an aspirator arranged in open communication with the interior of the tank, a pump for forcing liquid through said aspirator under pressure, a reservoir for receiving the liquid and entrained vapors from the aspirator, said reservoir being connected between the aspirator and the pump to form a circulatory system, and means for condensing a portion of the entrained vapors and exhausting the remaining portion thereof to atmosphere, said last named means including means for circulating a stream of air through said reservoir in contact with the liquid and entrained vapors from the aspirator.

2. The continuous method of cooling a confined body of liquid and vapors, which comprises the setting up of a circulation of liquid under pressure above the confined liquid to thereby exhaust confined vapors and cause a reduction in pressure, a vaporization of said confined liquid and the entrainment of the vaporization products in said circulated liquid, then separating a portion of the entrained vapors by contacting said circulated liquid and entrained vapors with a stream of air to thereby cause condensation of a portion of the vapors and the exhaust of the other portion thereof to atmosphere, and thereafter adding to the circulated liquid the liquid component of said vapors.

HENRY G. SCHAEFER.